United States Patent
Boury et al.

(10) Patent No.: US 10,576,671 B2
(45) Date of Patent: Mar. 3, 2020

(54) METHOD OF CONNECTING A SKIRT TO A THRUSTER BODY CASING

(71) Applicant: HERAKLES, Le Haillan (FR)

(72) Inventors: Didier Boury, Saint Medard en Jalles (FR); Jacques Rey, Merignac (FR); Romain Bernard, Le Haillan (FR); Agnès Aymonier, Begles (FR)

(73) Assignee: ARIANEGROUP SAS, Paris (FR)

( * ) Notice: Subject to any disclaimer, the term of this patent is extended or adjusted under 35 U.S.C. 154(b) by 578 days.

(21) Appl. No.: 15/029,407

(22) PCT Filed: Oct. 13, 2014

(86) PCT No.: PCT/FR2014/052596
§ 371 (c)(1),
(2) Date: Apr. 14, 2016

(87) PCT Pub. No.: WO2015/055928
PCT Pub. Date: Apr. 23, 2015

(65) Prior Publication Data
US 2016/0221236 A1    Aug. 4, 2016

(30) Foreign Application Priority Data
Oct. 16, 2013 (FR) ..................... 13 60077

(51) Int. Cl.
*B29C 45/14* (2006.01)
*F02K 9/36* (2006.01)
(Continued)

(52) U.S. Cl.
CPC .... *B29C 45/14467* (2013.01); *B29C 45/7207* (2013.01); *B29C 65/02* (2013.01);
(Continued)

(58) Field of Classification Search
CPC ..... B29C 65/542; B29C 65/544; B29C 65/54; B29C 45/14467; B29C 45/14491;
(Continued)

(56) References Cited

U.S. PATENT DOCUMENTS

| 4,737,335 A * | 4/1988 | Allebone ................ B29C 65/54 |
| | | 264/263 |
| 4,807,910 A * | 2/1989 | Johansson ............... B29C 65/12 |
| | | 285/21.2 |

(Continued)

FOREIGN PATENT DOCUMENTS

| EP | 0 354 692 A1 | 2/1990 |
| FR | 1 546 218 A | 11/1968 |

(Continued)

OTHER PUBLICATIONS

Imperial Metal Industries Limited, "Translation of FR 1546218 A", Published Nov. 15, 1968, Translated Mar. 26, 2018. (Year: 2018).*
(Continued)

*Primary Examiner* — Robert C Dye
*Assistant Examiner* — Sonny V Nguyen
(74) *Attorney, Agent, or Firm* — Pillsbury Winthrop Shaw Pittman LLP

(57) ABSTRACT

The terminal portion of a prefabricated skirt is connected to a casing of a thruster body in the vicinity of an end wall thereof using a method including positioning the terminal portion of the skirt with circumferential clearance around the casing of the thruster body in the vicinity of the end wall; keeping the skirt in position relative to the casing of the thruster body; closing both ends of an annular space between the terminal portion of the skirt and the casing of the thruster body; injecting elastomer into the annular space; and curing the elastomer.

9 Claims, 3 Drawing Sheets

(51) Int. Cl.
  *B29C 65/54* (2006.01)
  *B29C 65/02* (2006.01)
  *B29C 45/72* (2006.01)
  *B29C 65/00* (2006.01)
  *B29L 31/30* (2006.01)
  *B29K 19/00* (2006.01)
  *B29K 75/00* (2006.01)
  *B29K 83/00* (2006.01)

(52) U.S. Cl.
  CPC ...... *B29C 65/542* (2013.01); *B29C 66/00145* (2013.01); *F02K 9/36* (2013.01); *B29C 2045/1454* (2013.01); *B29K 2019/00* (2013.01); *B29K 2075/00* (2013.01); *B29K 2083/00* (2013.01); *B29L 2031/3097* (2013.01)

(58) Field of Classification Search
  CPC .. B29C 2045/14532; B29C 2045/1454; B29C 65/52; B29C 65/782; B29C 65/7823; B29C 65/7826; B29C 65/7835; B29C 66/92611; B29C 66/92613; B29C 66/92651; B29C 66/92653; B29C 66/92655; B29C 65/524; B29C 65/525; B29C 65/562; B29C 66/51; B29C 66/52; B29C 66/522; B29C 66/5221; B29C 66/5241; F02K 9/36; F02K 9/343; F02K 9/346
  USPC ........................................................ 264/261
  See application file for complete search history.

(56) References Cited

U.S. PATENT DOCUMENTS

| | | | | |
|---|---|---|---|---|
| 5,206,989 A | * | 5/1993 | Smith | F02K 9/28 29/447 |
| 5,830,308 A | * | 11/1998 | Reichard | B29C 65/7855 156/291 |
| 7,484,353 B1 | * | 2/2009 | Figge, Sr. | F02K 9/34 102/374 |
| 2006/0145018 A1 | * | 7/2006 | Rutan | B64G 1/14 244/171.1 |
| 2012/0043752 A1 | * | 2/2012 | McPherson | B29C 65/542 285/21.1 |
| 2012/0114497 A1 | * | 5/2012 | Petersen | F03D 1/0675 416/241 R |
| 2013/0140811 A1 | * | 6/2013 | Fahrer | F16L 13/103 285/285.1 |
| 2015/0137419 A1 | * | 5/2015 | Ullmann | B29C 65/542 264/261 |
| 2016/0123380 A1 | * | 5/2016 | Godon | B29C 65/542 403/66 |

FOREIGN PATENT DOCUMENTS

| | | |
|---|---|---|
| FR | 2 606 082 A1 | 5/1988 |
| GB | 1203230 A | 8/1970 |
| JP | 2002-332915 A | 11/2002 |
| JP | 2006-514726 A | 5/2006 |
| WO | WO 98/46960 A2 | 10/1998 |
| WO | WO 2004/085252 A2 | 10/2004 |

OTHER PUBLICATIONS

PRC-DeSoto, "Technical Data: P/S 890 Class B Fuel Tank Sealant," Published Dec. 2009, Accessed Nov. 13, 2018 (Year: 2009).*
International Search Report as issued in International Patent Application No. PCT/FR2014/052596, dated Jan. 27, 2015.
Notice of Reasons for Rejection as issued in Japanese Patent Application No. 2016-524035, dated Dec. 4, 2018.

* cited by examiner

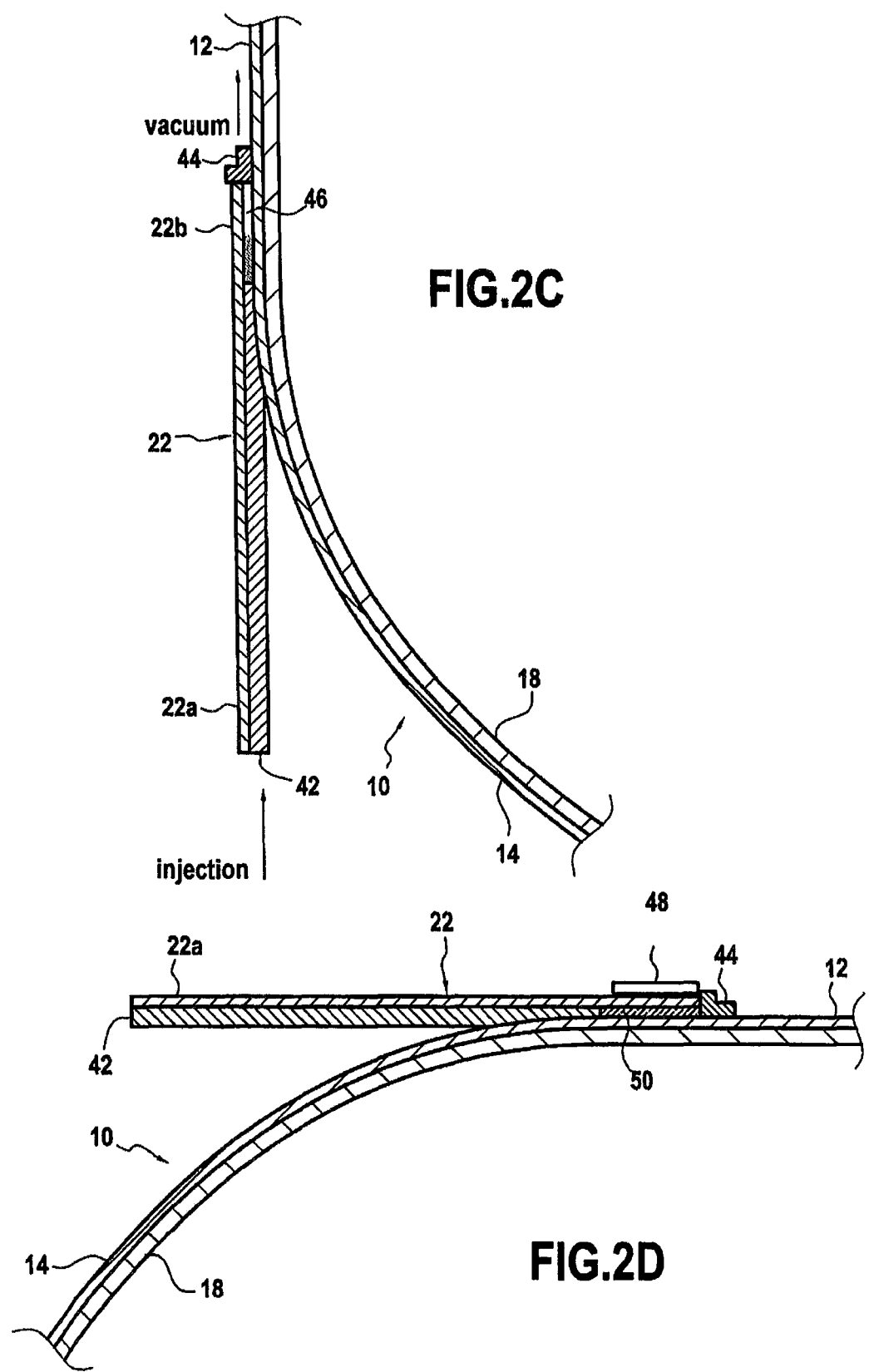

METHOD OF CONNECTING A SKIRT TO A THRUSTER BODY CASING

CROSS-REFERENCE TO RELATED APPLICATIONS

This application is the U.S. National Stage of PCT/FR2014/052596, filed Oct. 13, 2014, which in turn claims priority to French patent application number 1360077, filed Oct. 16, 2013. The content of these applications are incorporated herein by reference in their entireties.

BACKGROUND OF THE INVENTION

The invention relates to a thruster body of a solid propellant engine, in particular for a launcher or a missile.

Such a thruster body comprises a casing for containing the propellant and that is subjected to a high degree of internal pressure while the engine is in operation, the casing sometimes also being referred to as a pressure vessel. The casing as has a central portion or shroud that is substantially cylindrical and that is extended at its ends by a front end wall and a rear end wall that are formed integrally with the shroud. The casing is typically formed by filament winding on a mandrel using a carbon filament preimpregnated in resin, e.g. epoxy resin. Thermal protection and optionally a liner may be provided on the inside of the casing.

Front and rear polar bases facilitate filament winding at the end walls and they are used for mounting a thruster igniter and a nozzle.

Front and rear skirts are fastened on end portions of the shroud and they surround the front and rear end walls, at least in part. The skirts enable the engine to be incorporated in a vehicle (launcher or missile), to transmit thrust forces to the vehicle, and to take up stresses coming from the vehicle.

A difficulty encountered when fabricating such a thruster body lies in achieving good assembly between the casing and the skirts, in particular on a thruster body of large diameter having a casing that presents inevitable irregularities of shape.

SUMMARY OF THE INVENTION

In order to solve such a difficulty, the invention proposes a method of connecting a terminal portion of a skirt to a casing of a thruster body in the vicinity of an end wall of the casing, the skirt having a free portion extending from its terminal portion so as to surround said end wall, at least in part, the method comprising:
positioning the terminal portion of the prefabricated skirt with circumferential clearance around the casing of the thruster body in the vicinity of said end wall;
keeping the skirt in position relative to the casing of the thruster body;
closing both ends of an annular space between the terminal portion of the skirt and the casing of the thruster body;
injecting elastomer into said annular space; and
curing the elastomer.

Such a method presents several advantages.

The skirt can be centered very well relative to the casing, even in the presence of irregularities of shape in the casing or the skirt, since injecting the elastomer enables these irregularities to be compensated, which cannot be achieved with a prefabricated elastomer spacer.

The skirt and the casing are made separately, thus making it possible to reduce the time during which the installation for winding the casing is in use in comparison with making a skirt in situ by draping preimpregnated plies on the wound casing and on tooling for supporting the free portion of the skirt.

The skirt is free from creases or other defects of the kind that can result from draping directly on the casing or from sticking to a prefabricated elastomer spacer, because of shape defects.

The quality of the assembly makes it possible to omit over-winding on the skirt after it has been put into place on the casing.

The elastomer may be injected through tooling closing an end of said annular space and/or through the terminal portion of the skirt.

The elastomer may be injected while connecting the annular space to a vacuum source through tooling closing an end of the annular space and/or through the terminal portion of the skirt.

The injection may be performed while keeping the casing of the thruster body substantially vertical or horizontal.

According to a feature of the method, it further includes depositing adhesive on facing faces of the terminal portion of the skirt and of the casing of the thruster body, prior to injecting the elastomer.

When a rise in temperature is necessary or desirable for curing the elastomer, this may be obtained by means of a heater element arranged on the outside of the terminal portion of the skirt.

BRIEF DESCRIPTION OF THE DRAWINGS

FIGS. 2A, 2B, 2C, and 2D are highly diagrammatic fragmentary section views showing successive steps in an implementation of a method of the invention.

DETAILED DESCRIPTION OF AN EMBODIMENT OF THE INVENTION

Figure 1:
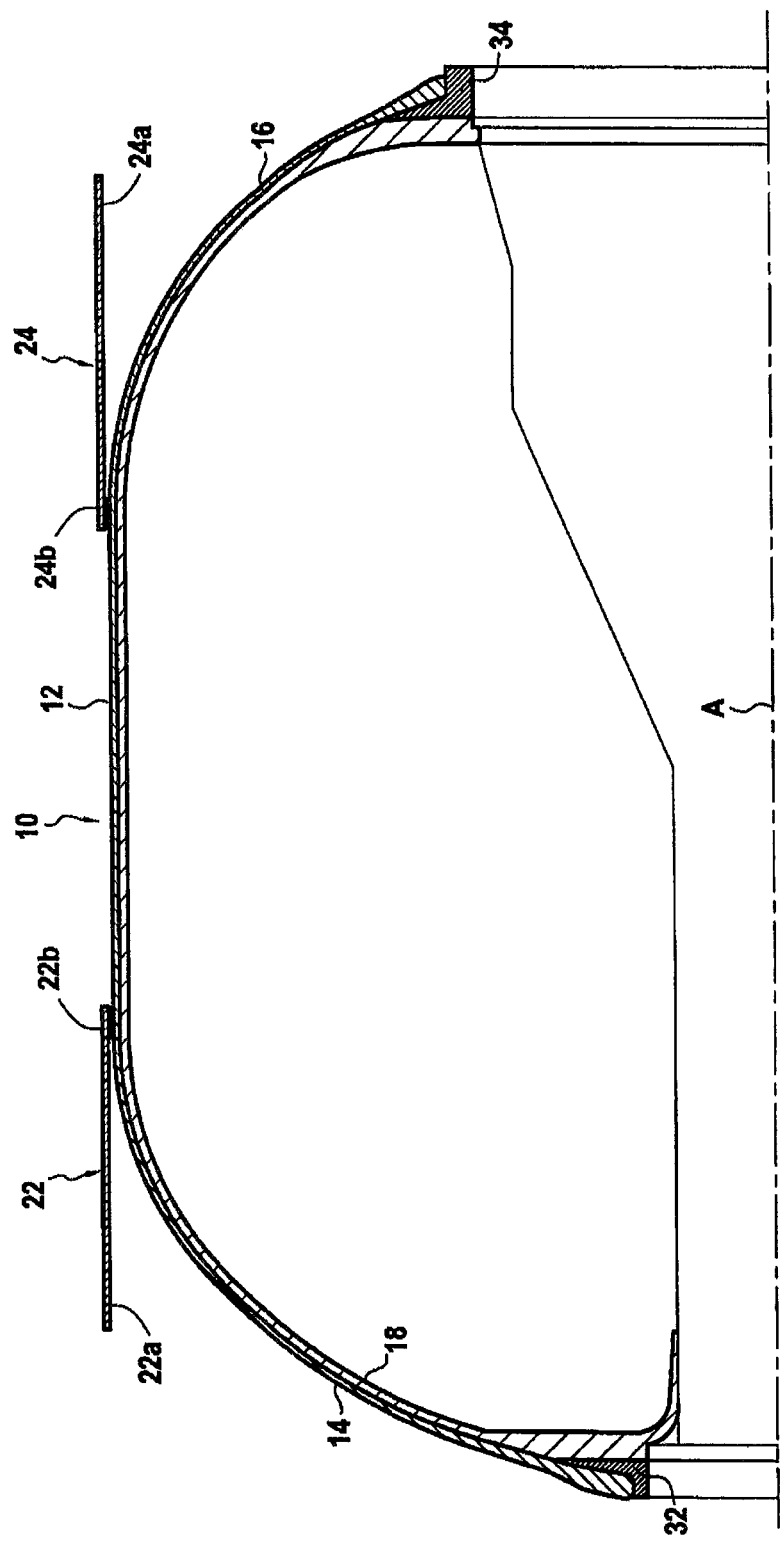
FIG. 1 is a view in axial half-section of a thruster body for a solid propellant engine.

FIG. 1 shows a thruster body of a solid propellant engine, the body comprising a casing 10, front and rear skirts 22 and 24, and front and rear polar bases 32 and 34.

The casing 10 is of axisymmetric shape about an axis A, and it comprises a substantially cylindrical central portion or shroud 12 and front and rear end walls 14 and 16. By way of example, the casing 10 is formed by filament winding and it defines the housing for the solid propellant. The inside surface of the casing 10 is provided with a thermal protection coating 18. It is also possible to provide a liner.

The polar bases 32 and 34 are for mounting an igniter of the engine and a nozzle (not shown), and they contribute to facilitating the filament winding of the casing 10 at the end walls 12 and 14.

As mentioned above, the skirts 22 and 24, of substantially annular shape, serve to connect the thruster body mechanically to other portions of the vehicle (e.g. a launcher or a missile) that is fitted with the engine. Each skirt has a terminal portion 22b, 24b secured with the casing 10 in the vicinity of the corresponding end wall, and a free portion 22a, 24a that extends from the terminal portion and that surrounds the end wall, at least in part. The term "free portion" is used herein to mean a portion that is not directly fastened to the casing.

A thruster body as briefly described above and as shown in FIG. 1 is itself well known.

With reference to FIGS. 2A to 2D, there follows a description of a particular implementation of the invention for making a connection between a thruster body casing and a skirt, such as the casing 10 and the front skirt 22 of FIG. 1.

The casing 10 and the skirt 22 are made separately. The casing 10 may be made by filament winding on a mandrel fitted with the polar bases of the thruster body, using a filament, e.g. made of carbon preimpregnated with a resin, e.g. epoxy resin, followed by polymerising the resin, it being understood that other known fabrication techniques could also be adopted.

The skirt 22 may be made of composite material or of metal. A skirt made of composite material may be obtained by draping plies and/or winding filaments on a mandrel, e.g. made of carbon fibers or of Kevlar® fibers, impregnated with a resin, e.g. epoxy resin, which is subsequently polymerised. The skirt 22 presents an inside diameter that is greater than the outside diameter of the shroud 12 of the casing 10.

Figure 2A:
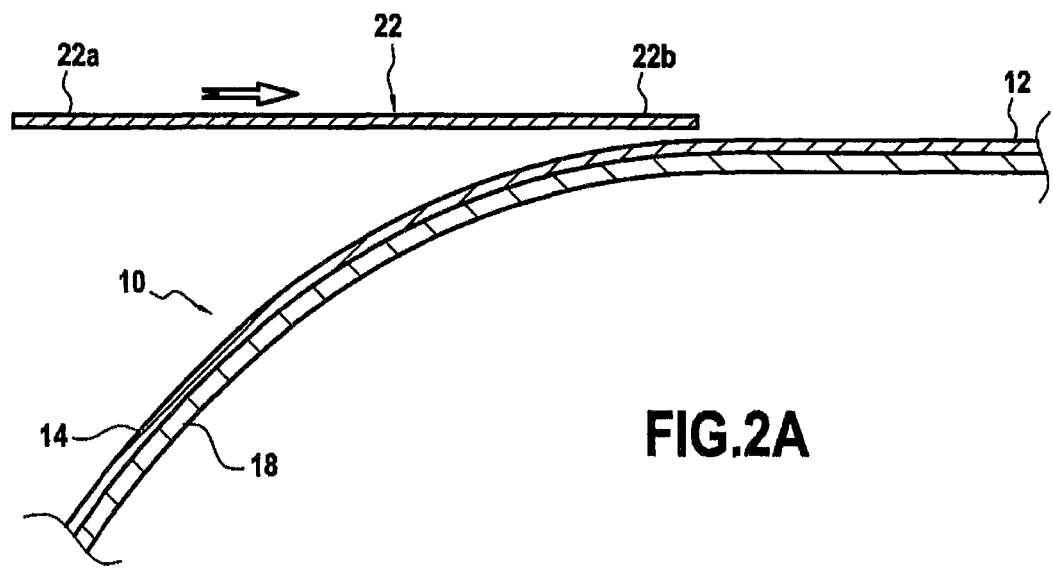
Figure 2B:
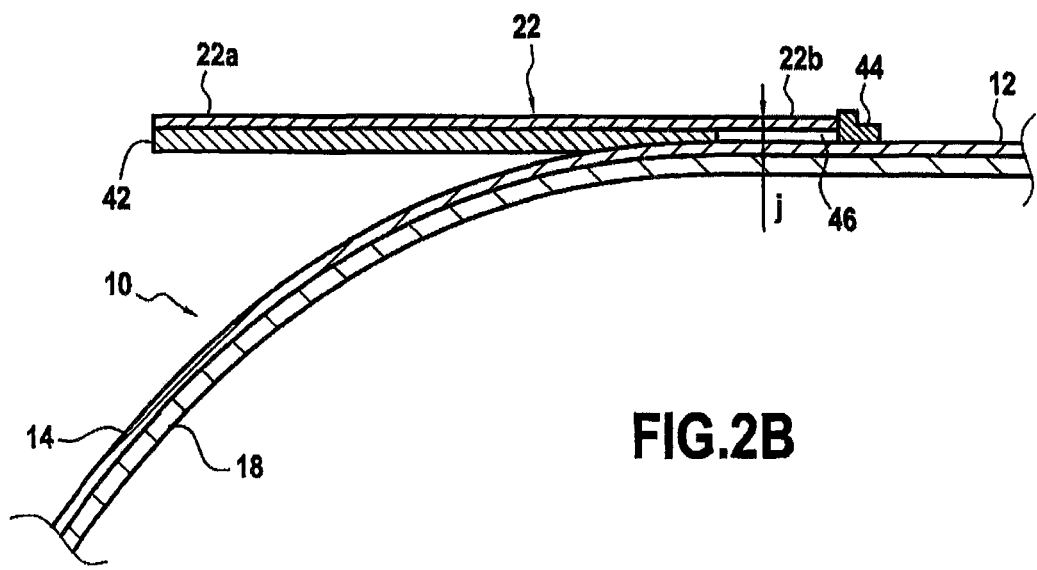

The skirt 22 is placed around the corresponding end wall of the casing 10, in this example the front end 14 (FIG. 2A), and it is then positioned relative to the casing 10 by means of annular tooling 42, 44 formed by removable rings (FIG. 2B). The front tooling 42 engages without clearance in the free portion 22a of the skirt 22 so as to position the skirt 22 radially relative to the casing 10 in such a manner as to ensure they have substantially the same axis. The rear tooling 44 forms an abutment for axially positioning the skirt 22 relative to the casing 10. Clearance j is thus arranged between the terminal portion 22b of the skirt 22 and the shroud 12 in the vicinity of the end wall 14. The size of the clearance j may lie in the range 1 mm to a few millimeters as a function in particular of the diameter of the thruster body, e.g. in the range 2 mm to 5 mm.

The front tooling 42 bears against the end wall 14, and the rear tooling 44 bears against the shroud 12 in order to close an annular space 46 between the terminal portion 22b of the skirt 22 and the casing 10 in the vicinity of the end wall 14. With the skirt 22 held in position relative to the casing 10, an elastomer is injected into the space 46 (FIG. 2C), e.g. with the axis A being substantially vertical. Injection may be performed through the front tooling 42 via one, or preferably several, passages (not shown) that are formed for this purpose. Simultaneously, the annular space 46 is connected to a vacuum source via one, or preferably several, passages (not shown) formed in the rear tooling 44. In a variant, injection may be performed through the rear tooling 44 and a connection with a vacuum source may be established through the front tooling 42. By way of example, the elastomer may be selected from the silicone, polyurethane, and polyisoprene families.

In another implementation, elastomer may be injected while the axis A is in a substantially horizontal position. Injection into and suction from the space 46 are then preferably performed through a plurality of injection and suction passages formed through the tooling 42 and 44.

In the description above, elastomer injection into the space 46 and suction from that space are performed through passages formed in the tooling 42 and 44. In a variant, or in addition, injection and suction may be performed through perforations formed in the terminal portion 22b of the skirt 22. It is also possible to perform injection through one or more passages formed in at least one of the pieces of tooling 42 and 44 and to perform suction through one or more perforations formed in the terminal portion 22b of the skirt 22, or vice versa.

Once the space 46 has been filled with an elastomer, the elastomer is cured. Depending on the nature of the elastomer, curing may be performed at ambient temperature or at a higher temperature, either because that is necessary, or because that is preferred. Under such circumstances, an annular heater muffle 48 (FIG. 2D) is placed against the outside of the terminal portion 22b of the skirt 22. In a variant, it is possible to arrange one or more heater strips around the terminal portion 22b of the skirt 22.

It should be observed that a layer of adhesive, or of adhesion primer, may be deposited on the facing faces of the casing 10 and of the terminal portion 22b of the skirt 22 prior to putting the skirt into position, with the deposited layer then being cured during the heat treatment for curing the elastomer.

A connection is thus obtained between the terminal portion 22b of the skirt and the casing 10 via an elastomer spacer 50 that is formed in situ, with intimate contact with the elastomer spacer over the entire length in the axial direction of the connection zone, and in spite of potential geometrical defects of the connected-together parts. This provides an effective connection between the coaxial skirt 22 and casing 10 without requiring any over-winding on the outside face of the terminal portion 22b of the skirt 22. The length of the connection zone in the axial direction may lie in the range from a few tens of millimeters to more than 100 mm, as a function in particular of the size of the thruster body, e.g. lying in the range 50 mm to 150 mm.

The connection between the casing 10 and a rear skirt may be made in similar manner. Naturally, the method can also be used when the thruster body is provided with only one skirt.

The invention claimed is:

1. A method of connecting a terminal portion of a prefabricated skirt to a casing of a thruster body in the vicinity of an end wall thereof, the skirt having a free portion extending from the terminal portion so as to surround said end wall, at least in part, the method comprising:
   positioning the terminal portion of the skirt with a circumferential clearance around the casing of the thruster body in the vicinity of said end wall;
   positioning the skirt relative to the casing by means of a first annular removable tooling and a second annular removable tooling, said first annular removable tooling engaging without clearance in the free portion of the skirt so as to position the skirt radially relative to the casing in such a manner as to ensure the skirt and the casing have substantially the same axis, and said second annular removable tooling forming an abutment for the terminal portion for axially positioning the skirt relative to the casing;
   keeping the skirt in position relative to the casing of the thruster body;
   closing both ends of an annular space between the terminal portion of the skirt and the casing of the thruster body, said first annular removable tooling bearing against the end wall and said second annular removable tooling bearing against a shroud of the casing in order to close both ends of the annular space;
   injecting elastomer into said annular space;
   curing the elastomer, and
   after curing the elastomer, disengaging the first annular removable tooling and the second annular removable tooling.

2. A method according to claim 1, wherein the elastomer is injected at least in part through one of the first and second annular removable toolings.

3. A method according to claim 1, wherein the elastomer is injected at least in part through the terminal portion of the skirt.

4. A method according to claim 1, wherein the elastomer is injected while connecting the annular space to a vacuum source at least through one of the first and second annular removable toolings closing both ends of the annular space.

5. A method according to claim 1, wherein the elastomer is injected while connecting the annular space to a vacuum source at least through the terminal portion of the skirt.

6. A method according to claim 1, wherein the injecting is performed while keeping the casing of the thruster body substantially vertical.

7. A method according to claim 1, wherein the injecting is performed while keeping the casing of the thruster body substantially horizontal.

8. A method according to claim 1, further including depositing adhesive on facing faces of the terminal portion of the skirt and of the casing of the thruster body, prior to injecting the elastomer.

9. A method according to claim 1, wherein the elastomer is cured by means of a heater element arranged on the outside of the terminal portion of the skirt.

* * * * *

UNITED STATES PATENT AND TRADEMARK OFFICE
CERTIFICATE OF CORRECTION

PATENT NO. : 10,576,671 B2
APPLICATION NO. : 15/029407
DATED : March 3, 2020
INVENTOR(S) : Didier Boury et al.

Page 1 of 1

It is certified that error appears in the above-identified patent and that said Letters Patent is hereby corrected as shown below:

In the Specification

Column 1, Line 21, in the paragraph that begins on Line 17, please delete the word "as"

Signed and Sealed this
Seventh Day of July, 2020

Andrei Iancu
*Director of the United States Patent and Trademark Office*